United States Patent
Takahashi et al.

(10) Patent No.: US 7,586,282 B2
(45) Date of Patent: Sep. 8, 2009

(54) HARDWARE BASED CONFIGURABLE MOTION CONTROL APPARATUS AND METHOD

(75) Inventors: Toshio Takahashi, Rancho Palos Verdes, CA (US); William Banzhof, Alpine, CA (US); Jean Lindstrom, Ramona, CA (US)

(73) Assignee: International Rectifier Corporation, El Segundo, CA (US)

( * ) Notice: Subject to any disclaimer, the term of this patent is extended or adjusted under 35 U.S.C. 154(b) by 468 days.

(21) Appl. No.: 11/612,993

(22) Filed: Dec. 19, 2006

(65) Prior Publication Data

US 2007/0108932 A1 May 17, 2007

Related U.S. Application Data

(63) Continuation of application No. 10/965,386, filed on Oct. 14, 2004, now Pat. No. 7,166,982.

(60) Provisional application No. 60/511,782, filed on Oct. 15, 2003, provisional application No. 60/514,419, filed on Oct. 23, 2003.

(51) Int. Cl.
*B25J 9/22* (2006.01)

(52) U.S. Cl. .............. 318/568.13; 318/567; 318/569.12

(58) Field of Classification Search ............ 318/568.13, 318/567, 569; 364/514
See application file for complete search history.

(56) References Cited

U.S. PATENT DOCUMENTS

2007/0110227 A1* 5/2007 Yokouchi .................... 380/28

* cited by examiner

*Primary Examiner*—Karen Masih
(74) *Attorney, Agent, or Firm*—Farjami & Farjami LLP

(57) ABSTRACT

Apparatus for generating a motion control algorithm for the control of an AC electric machine, the apparatus comprising a motion control engine comprising a motion control sequencer, a motion control program memory, a port memory, a plurality of motion control modules, and a plurality of motion peripheral modules, the motion control sequencer executing a sequence of instructions stored in the motion control program memory directing the sequencer to execute motion control modules and motion peripheral modules in a specified sequence and with a specified connection of module inputs and module outputs and operational parameters stored in the port memory to generate the motion control algorithm. A microcontroller may be coupled to the motor control program memory and the port memory for monitoring the output of the motion control engine.

12 Claims, 9 Drawing Sheets

| Motion Control Engine Opcode map Version 0.2 | | | | | |
|---|---|---|---|---|---|
| MCE CLOCK CYC | OPCODE FETCH / OPERAND 1 FETCH | | OPERAND 2 FETCH | EXECUTION | |
| | 1 | | 2 | 3 | |
| OPERATION | OPCODE | OPERAND 1 | OPERAND 2 | EXECUTION | PC |
| NOP | 0x0 | N/A | N/A | N/A | PC=PC+2 |
| MOVE | 0x1[15:12] | DESTINATION (11:0) | SOURCE ADDRESS (11:0) | UPDATE DESTINATION | PC=PC+2 |
| | | SRAM | SRAM | | |
| | | ACC | ACC | | |
| | | MODULE WRITE REGISTER | MODULE READ REGISTER | | |
| | | SCE MODULE CONTROL REGISTER | | | |
| MOVE-LITERAL | 0x2[15:12] | DESTINATION (11:0) | LITERAL VALUE (15:0) | UPDATE DESTINATION | PC=PC+2 |
| | | SRAM | | | |
| | | ACC | | | |
| | | MODULE WRITE REGISTER | | | |
| | | SCE MODULE CONTROL REGISTER | | | |
| WAIT | 0x3[15:12] | BIT TO WAIT ON (3:0) | SOURCE ADDRESS (11:0) | WAIT BIT | PC=PC+2 |
| | | | SRAM | | |
| | | | ACC | | |
| | | | MODULE READ REGISTER | | |
| JUMP | 0x4[15:12] | N/A | LITERAL VALUE (15:0) | JUMP | PC=LITERAL |
| ROTATE-RIGHT | 0x5[15:12] | NUMBER OF BITS (3:0) | SOURCE ADDRESS (11:0) | UPDATE ACC | PC=PC+2 |
| | | | SRAM | | |
| | | | ACC | | |
| ZERO-EXTEND | 0x6[15:12] | STARTING BIT TO EXTEND (3:0) | SOURCE ADDRESS (11:0) | UPDATE ACC | PC=PC+2 |
| | | | SRAM | | |
| | | | ACC | | |
| | | | MODULE READ REGISTER | | |
| SIGN-EXTEND | 0x7[15:12] | SIGN BIT (3:0) | SOURCE ADDRESS (11:0) | UPDATE ACC | PC=PC+2 |
| | | | SRAM | | |
| | | | ACC | | |
| | | | MODULE READ REGISTER | | |
| OR | 0x8[15:12] | SOURCE ADDRESS (11:0) | LITERAL VALUE (15:0) | UPDATE ACC | PC=PC+2 |
| | | SRAM | | | |
| | | ACC | | | |
| | | MODULE READ REGISTER | | | |
| AND | 0x9[15:12] | SOURCE ADDRESS (11:0) | LITERAL VALUE (15:0) | UPDATE ACC | PC=PC+2 |
| | | SRAM | | | |
| | | ACC | | | |
| | | MODULE READ REGISTER | | | |
| XOR | 0xA[15:12] | SOURCE ADDRESS (11:0) | LITERAL VALUE (15:0) | UPDATE ACC | PC=PC+2 |
| | | SRAM | | | |
| | | ACC | | | |
| | | MODULE READ REGISTER | | | |
| ADD | 0xB[15:12] | SOURCE ADDRESS (11:0) | LITERAL VALUE (15:0) | UPDATE ACC | PC=PC+2 |
| | | SRAM | | | |
| | | ACC | | | |
| | | MODULE READ REGISTER | | | |
| SUB | 0xC[15:12] | SOURCE ADDRESS (11:0) | LITERAL VALUE (15:0) | UPDATE ACC | PC=PC+2 |
| | | SRAM | | | |
| | | ACC | | | |
| | | MODULE READ REGISTER | | | |

Figure 3: MCE Instruction Set

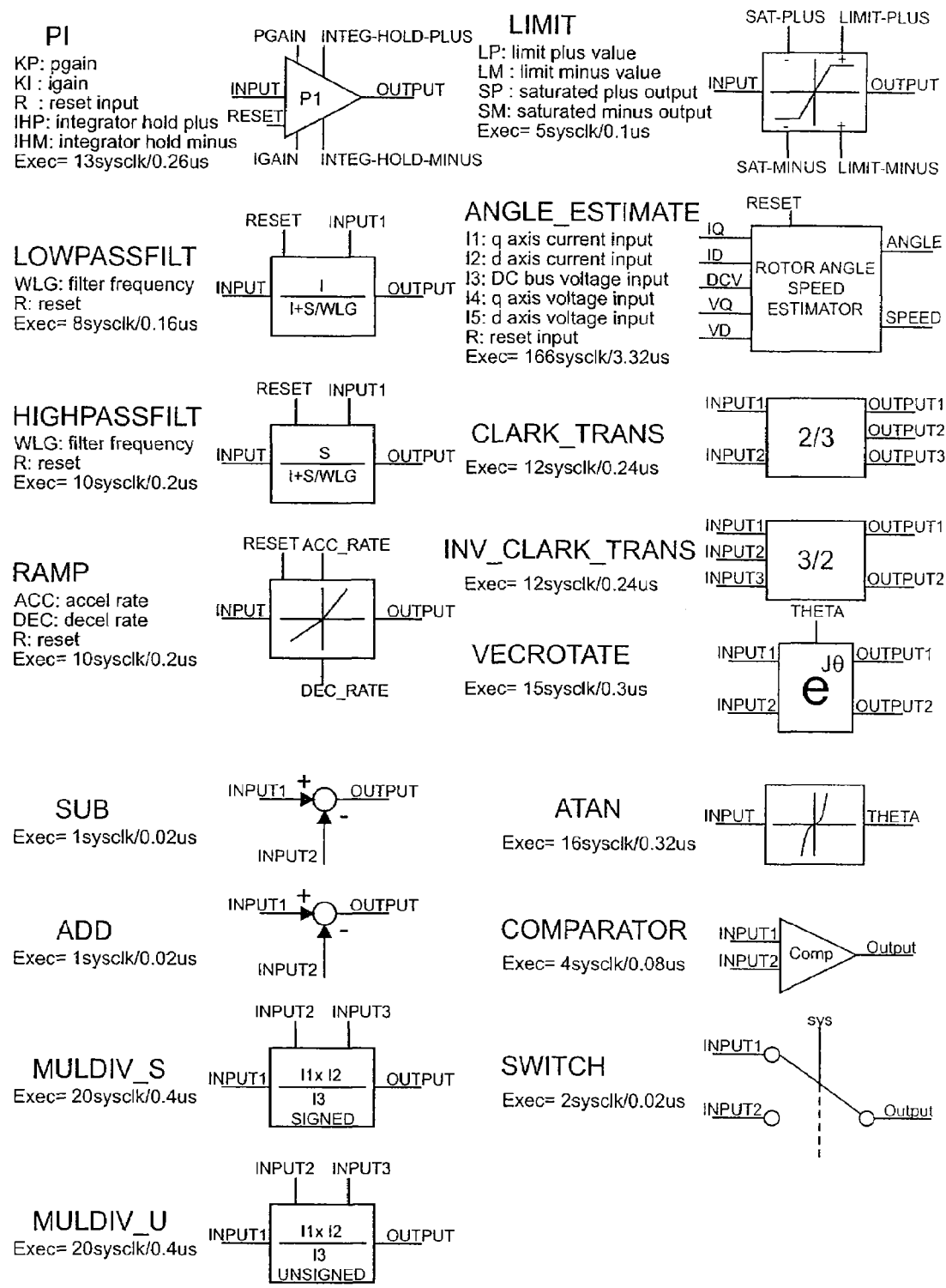
Figure 4: Motion Control Modules

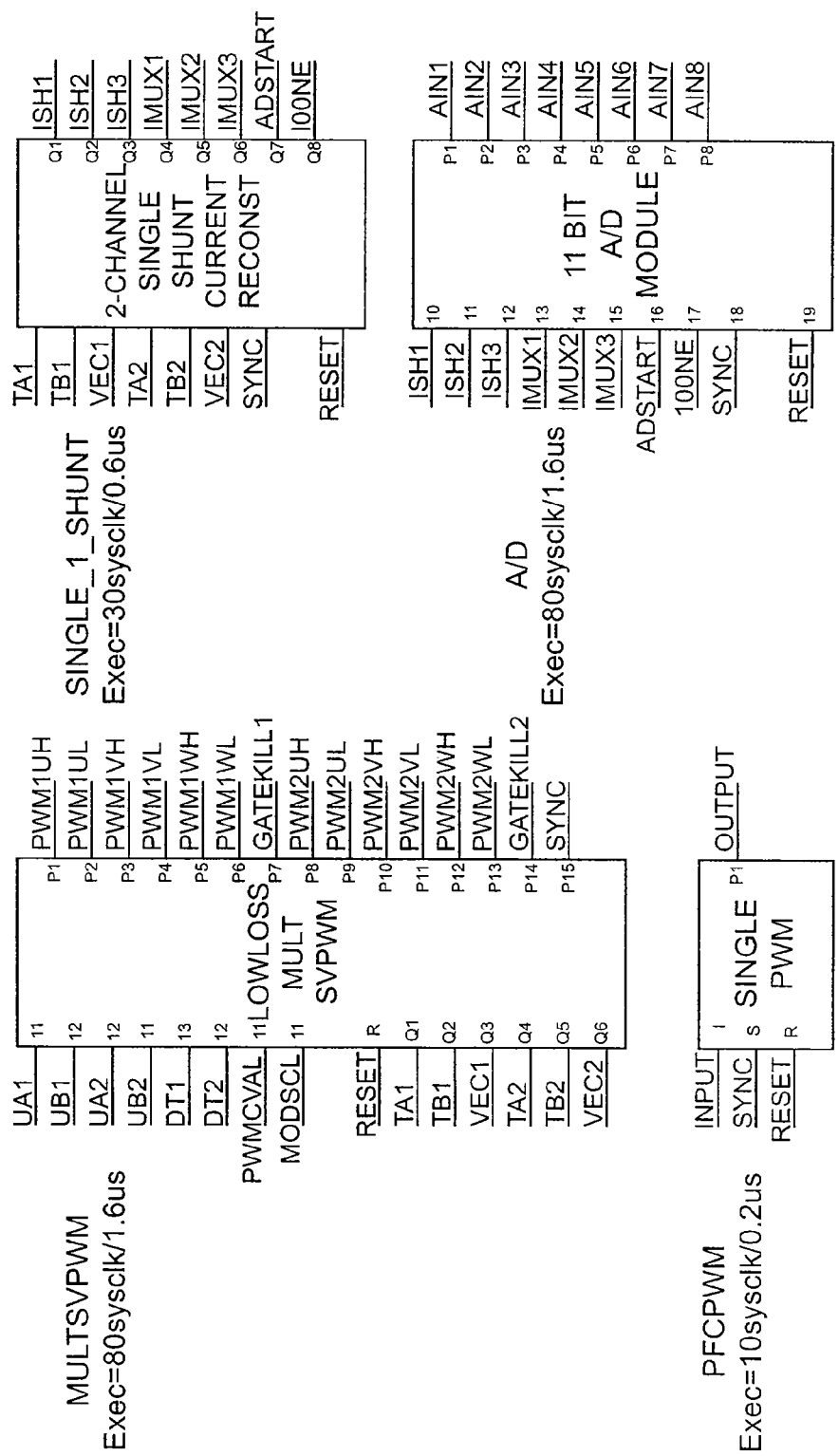
Figure 5: Motion Peripheral Modules

HARDWARE BASED CONFIGURABLE MOTION CONTROL APPARATUS AND METHOD

CROSS REFERENCE TO RELATED APPLICATIONS

This is a continuation of U.S. patent application Ser. No. 10/965,386 filed Oct. 14, 2004 and entitled HARDWARE BASED CONFIGURABLE MOTION CONTROL APPARATUS AND METHOD, which application claims the priority and benefit of U.S. Provisional Application Ser. No. 60/511,782, filed Oct. 15, 2003 (IR-2596 Prov) entitled HARDWARE BASED CONFIGURABLE MOTION CONTROL ALGORITHM and U.S. Provisional Application Ser. No. 60/514,419 filed Oct. 23, 2003 (IR-2612 Prov) entitled HIGH PERFORMANCE AC DRIVE BY SINGLE CHIP MOTION CONTROL ENGINE IC, the entire disclosures of each of which are incorporated by reference herein.

BACKGROUND OF THE INVENTION

The present invention relates to an apparatus and method for the design and configuration of a motion control algorithm of an AC machine (for example, an induction motor or permanent magnet motor). The new method, which is called Motion Control Engine ("MCE"), provides a variety of basic functional control elements implemented in hardware, and uses a unique motion control sequencer to generate connections between control elements. The motion control sequencer routes signals between functional control elements as specified by the user to achieve fully configurable control signal connections.

Unlike the traditional development method for motion control algorithms, which is based on either microcontroller or DSP (Digital Signal Processor) programming, MCE provides faster computation, smaller silicon die area and significant design time reduction.

Designing high performance servo control systems is a complex task. It normally involves multiple talents and disciplines in different technology fields. Therefore, many design engineers are typically involved in the design process which involves a deep understanding of power electronics technology, hardware integration, advanced control algorithms, flexible user interfaces, network communication, and so on.

Among those design factors are control algorithms, which critically influence the final system performance. Control algorithms include various elements to interface to sensors, which are closely coupled with power electronics circuit and elements. Position, speed, and current are essential variables that need to be fedback from appropriate sensors. Controlling three-phase AC motors requires Field Orientation Control (FOC). The objective of the FOC is to establish linear control of torque by transforming three-phase AC current and voltage.

The FOC senses 3-phase motor current and transforms the sensed currents into two variables, torque current and field current, so that it simplifies torque control. Therefore, closed loop current control actually contains two separate current control loops. One is for torque current and the other is for field current. Each loop is identical and consists of several control elements. Vector rotator, Clark transformation, Proportional plus integral (PI), PWM, and current sensing are some of these essential control elements in each closed loop current control.

Besides the PWM and current sensing functions, all control elements are traditionally implemented by software code in a motion control DSP or microcontroller. In a real-time control environment with a DSP and a microcontroller, these current control loops are implemented in high priority tasks. It requires intensive knowledge or real-time control to make sequential execution of each control element to complete computation within a specified time frame.

These tasks, often driven by specific hardware events/interrupts, require precise execution timing of software, requiring sequencing of instruction coding to manipulate hardware at specific times in order to control a motor.

When designing a motion control algorithm such as field orientation control (FOC), two stages are normally involved in the design effort. One stage is to figure out the required control structure in a control block diagram (an example is shown in FIG. 1). The other stage is to implement by programming the code which is executed by the selected microcontroller or DSP.

The first stage is the task to define the detailed structure of the control scheme with each control element, sampling frequency, data range, quantization error, resolution, and data format. This task is normally achieved by a control engineer. An example is shown in FIG. 1. The second stage is to implement a defined algorithm in software code such as assembly language and/or C language, and test the implemented code. This task is implemented by a software engineer or the same control engineer depending on the project.

When implemented in software code using a conventional microcontroller or DSP, execution time by the selected microcontroller or DSP will vary depending on the skill and coding experience of the software engineer. If execution time cannot be met to the original specification, the bandwidth of the control will not be acceptable, therefore reducing the dynamic performance of the motor drive. Readability of the code also depends on each person's skill regardless of the coding language the engineer chooses. This will often create an undesired result that does not meet the original performance target. More specifically, computation time or execution time of the control task (i.e. the closed loop current control) may exceed the desired time due to improper coding technique combined with the nature of sequential execution of the microcontroller or DSP.

FOC for servo application and sensorless control is usually written in the assembly language rather than a high level language. This is due to the fact that these applications often demand fast computation and update rates in order to satisfy growing demand for higher dynamic performance. Sometimes special coding techniques, (i.e., use of shift instructions to achieve fast multiply/divide functions are used to achieve fast computation to overcome classic computation power sluggishness.

Regardless of high level language (i.e., C, C++, etc) or low level assembly language, and regardless of the use of a DSP or a microcontroller, programming requires the specific skill of writing motion action into all sequential computational descriptions consisting of thousand of lines instructions. Then all of the pieces of source code of the software modules (i.e., software is normally modularized) are compiled and linked together. Finally, it becomes one big executable object code which contains all functions including closed loop control, user interface sequencing, network communication, etc. If errors or mistakes exist, then they must be discovered and fixed at the source code level, and recompiled and linked again to produce the revised version of the executable object code. This process is usually repeated a number of times to reach the final product.

Development time required for programming and coding also varies. It takes less time for an experienced software engineer. Software tasks are sometimes split between non-control (or non real-time) related tasks and control (or real-time) tasks. For some cases, multiple software engineers work together on the same project. For example, one software engineer is assigned to work on the control tasks while another software engineer is assigned to work on the communication and user interface tasks. Timing interface and data interface between these tasks becomes very critical and creates additional effort in the development of complete software.

Although it has been the established development method over the last two decades, microcontroller and/or DSP programming always requires special attention to minimize the development time while meeting execution time or computation time of the implemented code.

Another trade-off is code maintenance. The code maintenance cost is usually a hidden cost and does not show up at the start of development phase.

Therefore, quick motion control algorithm development while achieving high performance is still a challenging job for high performance servo system and sensorless AC motor drive system development.

SUMMARY OF THE INVENTION

According to the invention, a Motion Control Engine (MCE) is provided comprising hardware implemented in silicon, for example, which enables faster execution of the control algorithm and shortens development time when compared to traditional programming methods associated with a microcontrollers or DSPs.

An object of the invention is to increase bandwidth and thus dynamic performance by shortening the computation time by hardware control while at the same time simplifying the development method of the control algorithm.

According to the invention, there is provided an apparatus for generating a motion control algorithm for the control of an AC electric machine, the apparatus comprising, a motion control engine comprising, a motion control sequencer, a motion control program memory, a port memory, a plurality or motion control modules; and a plurality of motion peripheral modules,the motion control sequencer executing a sequence of instructions stored in the motion control program memory directing the sequencer to execute selected ones of the motion control modules and motion peripheral modules in a specified sequence and with a specified connection of module inputs and module outputs and operational parameters stored in the port memory to generate the motion control algorithm. A microcontroller may be coupled to the motor control program memory and the port memory for monitoring the output of the motion control engine.

According to another aspect, there is provided a method for generating a motion control algorithm for the control of an AC electric machine, the method comprising, providing a motion control engine comprising, a motion control sequencer, a motion control program memory, a port memory, a plurality of motion control modules, and a plurality of motion peripheral modules, and executing using the motion control sequencer a sequence of instructions stored in the motion control program memory to direct the sequencer to execute selected one of the motion control modules and motion peripheral modules in a specified sequence and with a specified connection of module inputs and module outputs and operational parameters stored in the port memory thereby to generate the motion control algorithm. The invention can be applied not only to motor control but also to other applications such as digital power supply controls and digital power electronic controls.

Other features and advantages of the present invention will become apparent from the following description of the invention which refers to the accompanying drawings.

BRIEF DESCRIPTION OF THE DRAWING(S)

The invention will now be described in greater detail in the following detailed description, with reference to the drawings, in which:

FIG. 3 shows an example of an MCE instruction set;

FIG. 4 shows exemplary motion control modules;

FIG. 5 shows exemplary motion peripheral modules;

DETAILED DESCRIPTION OF THE INVENTION

Figure 2:
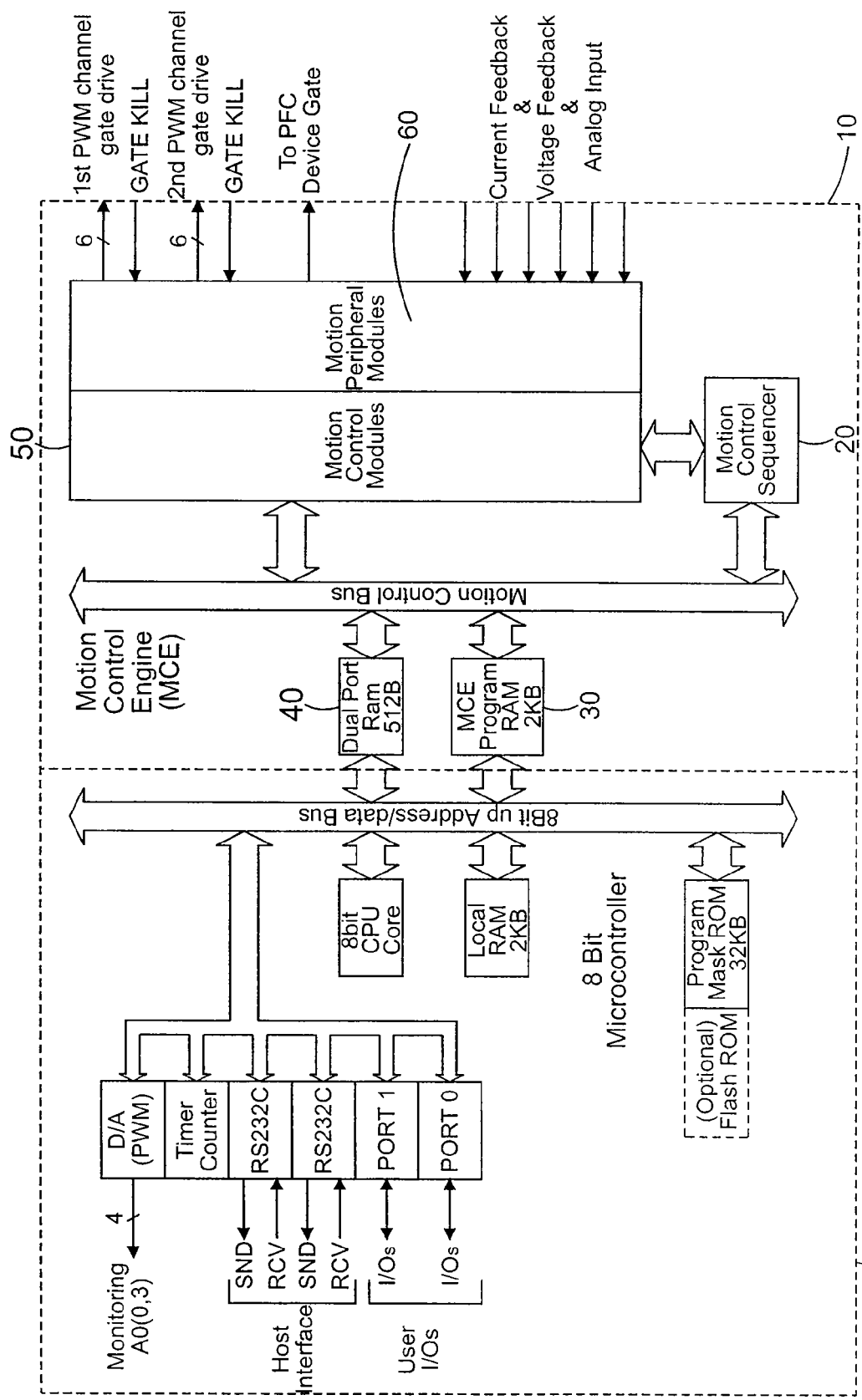
FIG. 2 shows the basic architecture of the system according to the invention.

With reference now to the drawings. FIG. 2 shows the basic architecture of the MCE system, combined with a microcontroller system as an example.

Figure 1:
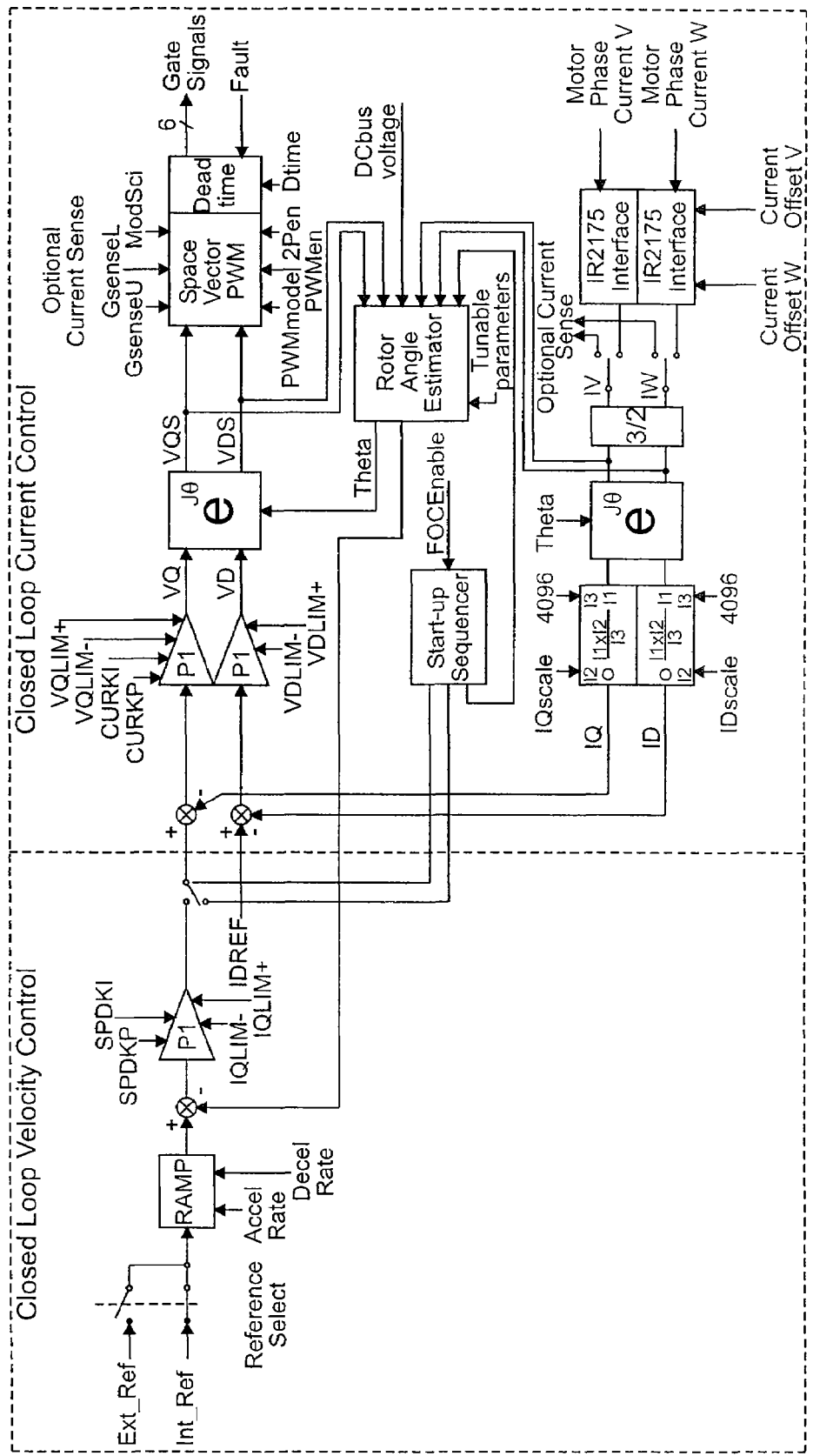
FIG. 1 is a block diagram of an example of a control structure for the control of an AC machine which can be implemented by the system of the invention.

In this example, the MCE 10 performs the time critical computational task of the closed loop current control (see FIG. 1) of the AC machine in conjunction with sensorless control, velocity control, PWM (pulse width modulation), and current sensing. The MCE 10 is interfaced with a generic microcontroller 100 via an internal bus. The microcontroller 100 may be, e.g., an 8 bit microcontroller of known type and performs non-time critical tasks such as communication with a host interface, monitoring and sequencing I/O, in this example.

The MCE 10 consists of an MCE sequencer 20, MCE program memory 30, dual port memory 40, motion control modules 50, and motion peripheral modules 60. The MCE sequencer 20 executes instructions stored in MCE program memory 30. These instructions direct the MCE sequencer 20 to execute motion control modules 50 and motion peripheral modules in a specified sequence and with a specified mapping or "connection" of module inputs and outputs and operational parameters stored in dual port memory 40.

The MCE sequencer 20 controls the execution and I/O mapping of motion control modules 50 and motion peripheral modules 60. The sequencer 20 preferably functions as a reduced instruction set controller (RISC), executing encoded instructions stored in MCE program memory 30. An exemplary instruction set is shown in FIG. 3. The instruction set is tailored to the highly specialized operations that the MCE sequencer 20 must perform. The instructions can be grouped into three categories:

a. Move instructions, used to load module inputs and save module outputs;

b. Arithmetic instructions, used to manipulate data in the process of mapping or connecting module inputs and outputs;

c. Processor and program control instructions, used to execute motion control and motion peripheral modules and to modify program flow.

A specialized set of development tools including an MCE compiler allows a control engineer (the "user") to create a graphical motion control design and "compile" that design into MCE program code (the instruction set of which an example is shown in FIG. 3) that uniquely implements the user's exact design requirements.

Using graphical images on a display of the development tool, the user selects motion control modules and motion peripheral modules, connects their inputs and outputs in a desired sequence, and specifies which inputs are to be supplied at runtime as operational parameters and which outputs are to be available externally to the MCE 10 for monitoring and diagnostic purposes.

The MCE compiler analyzes the graphical design to determine:

a. The optimal sequence of module execution;

b. The operational parameters to be defined as module inputs;

c. The module outputs to be externally accessible; and d. The routing of module input and output signals.

The MCE compiler then determines an appropriate layout of data usage in the dual port 40 memory and encodes a detailed sequence of MCE instructions (MCE instruction set) to load inputs and route outputs for each module to be executed.

In general, the MCE instruction sequence performs the following operations for each motion control module 50 and peripheral module 60 to be executed:

a. For each of the module's inputs, move a data value from a location in dual port memory 40 to a memory-mapped hardware register address of the module dedicated to that specific module input. The source address may be: (1) a location assigned to an operational parameter; (2) a temporary storage location holding a saved output from a module executed earlier in the execution sequence; or (3) a location assigned to hold a saved module output that is available to an external processor for monitoring and diagnostic purposes.

When all module input registers are loaded, write to the module's control/status register to start module execution and check the value of the module's control/status register to poll for module completion. Note that operation of the MCE sequencer 20 is not blocked during module execution, allowing multiple MCE control modules 50 and/or peripheral modules 60 to be executed simultaneously.

When module execution is complete, for each of the module's outputs, move the data value stored by the module in its dedicated memory-mapped hardware output register to a location in dual port memory 40. The destination address may be: (1) a temporary storage location to be used for input to a module executed later in the execution sequence; or (2) a location assigned to hold the module output where it can be accessed externally for monitoring and diagnostic purposes.

The MCE program memory 30 is used to store the instructions executed by the MCE sequencer 20. On reset, the MCE sequencer 20 begins program execution at the first location in MCE program memory 30. A program counter is incremented on each instruction execution so that instructions are executed sequentially through ascending addresses in program memory. Certain instructions ("branch", for example) modify the program counter value and thus alter the sequence of instruction execution. MCE instructions cannot modify the content of the program memory.

Dual port memory 40 allows an external processor, such as microcontroller 100, to configure and monitor MCE operation. The MCE uses dual port memory 40 for:

a. Retrieval of operational parameters, which can be configured as inputs to motion control modules 50 and/or motion peripheral modules 60;

b. Storage of certain module outputs for access by an external processor for the purposes of monitoring and diagnostics; and c. Temporary storage of module outputs for transfer to inputs of modules executed later in the execution sequence;

The MCE program code defines the specific allocation of data within dual port memory 40 depending on the user's definition of operational parameters, module sequence and signal connections, and desired data points for monitoring and diagnostic purposes.

The motion control modules 50 are a collection of control elements, each of which is an individually functional hardware component designed as an independent piece of hardware. Examples of the motion control modules are illustrated in FIG. 4. Although some elements are similar to the analog equivalent functions (i.e., low pass filter, PI-Proportional plus Integral, comparator, etc.), all are preferably implemented in digital hardware by z-transformation. Each functional element has defined inputs and outputs and may make use of operational parameters specified at runtime. Each module's inputs and outputs are assigned dedicated hardware registers.

When the control engineer designs the control structure (for example, see FIG. 1) of a motion control algorithm, each functional element is uniquely connected to others in order to achieve the desired control function. This connection information is implemented through dual port memory 40, which holds data passed from one functional block to another. Actual data passing is controlled by the MCE sequencer 20, which executes instruction commands specifying the specific output data of one functional element block that is to be transferred to the specific input of another functional element block via a specific location of dual port memory 40.

The motion peripheral modules 60, like the motion control modules 50, are a collection of independent hardware components. Examples of the motion peripheral modules are illustrated in FIG. 5. Each motion peripheral module 60 provides an interface to an external (peripheral) device. The MCE sequencer 20 controls the connections between motion peripheral modules 60 and motion control modules 50 in the same manner described above. Examples of the motion peripheral modules include multiple space vector pulse width modulation (MULTSVPWM), power factor correction PWM (PFCPWM) single current shunt, A/D and D/A.

Figure 6:
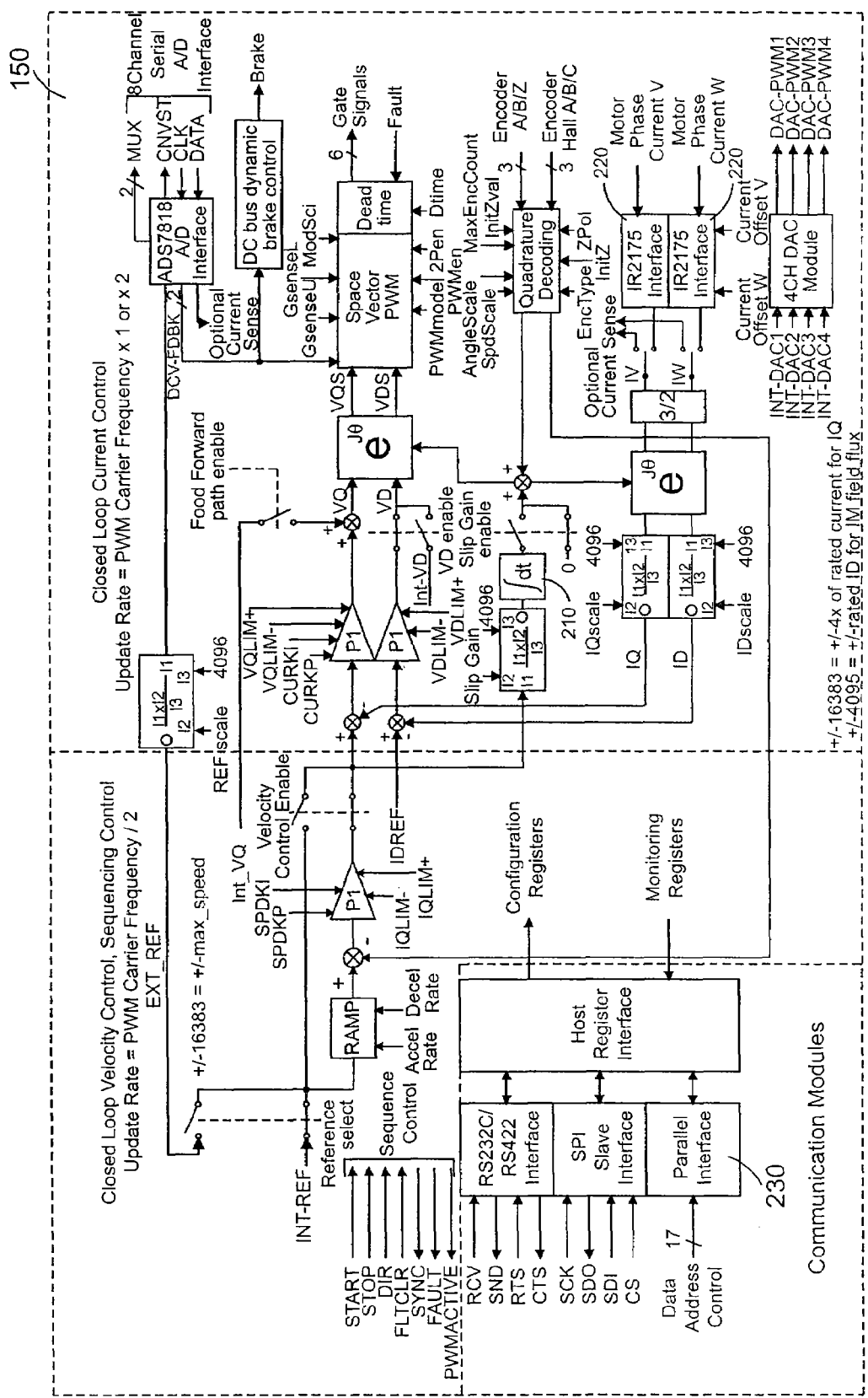
FIG. 6 shows another control structure which can be implemented by the invention.

FIG. 6 shows another exemplary control structure, which can be implemented by the invention, and provided as an integrated circuit (IC) aimed at high performance servo applications and sensorless control applications. The circuit can be implemented on a cost effective 100-pin QFP package or an 80-pin QFP package ICs. These ICs simply require an inexpensive crystal resonator to feed the clock. These ICs simplify the task of servo drive system design and quickly enable high performance servo drive, and can achieve high performance sinusoidal sensorless control of permanent magnet AC motors, for example. Once hardware is realized with the IC, motor tuning, for example, becomes readily available without spending the time and effort of programming. All functions are implemented in the hardware. Unlike a traditional motion control DSP, the IC contains not only motion peripheral functions (i.e., PWM, encoder counter circuit, current sensing interface, etc) but also a complete field orientation control algorithm and speed control algorithm in hardware form, the MCE.

The MCE consists of control elements (i.e., Proportional plus integral, Vector rotator, Clark transformation, etc) necessary to perform closed loop controls, motion hardware peripherals (i.e., Space Vector PWM, motor current feedback interface, encoder feedback), and flow control logic, which enables parallel multi-loop control. Therefore, no multi-tasking is required. Synchronous execution of the closed loop velocity control and closed loop current control is included in the logic hardware.

The circuit of FIG. 6 is a digital integrated circuit that implements all necessary functions of the encoder based servo control in hardwired logic. Therefore, the structure is pre-configured as shown in FIG. 6, yet it allows a different structure of the control algorithm. A vector controlled induction motor is one example. The internal control structure has a feed forward slip gain path 20 to the vector angle generation. Closing the associated switch 20 on the path can enable this control configuration. Therefore, enabling and disabling induction motor control can be done simply by closing or opening the switch, more precisely by writing a "1" or "0" value to the associated write register by the PC. The circuit supports other structural changes such as interfacing with a different type of current sensor rather than the IR2175 current sensing IC shown (220), enabling/disabling feed forward gain path in the current control, enabling/disabling the velocity closed loop control, and selecting the source of the velocity command.

The circuit of FIG. 6 does not require any programming and/or coding. Therefore, it can be converted to a fixed function and hardwired logic IC, as a stand-alone servo controller, without requiring any PC interface at all. The configuration process to adapt a new motor and tuning uses host registers that can be read or written by either a PC or a mating microprocessor through an RS232C serial interface or SPI serial interface or parallel interface 230. Writing specific values into the associated registers configures a servo drive very quickly with the desired performance and functions. For example, if a 10 kHz PWM switching frequency for inverting power electronic is chosen, then the user writes a corresponding value to the associated register. The user does not have to write codes to implement the PWM algorithm. Once the drive is configured through writing to host registers, no additional step is required. (No software compilation and assembly of the final object code is required).

One significant advantage of the Motion Control Engine is a very short computation time to complete the closed loop control algorithm with deterministic timing. Fast computation directly influences the dynamic performance of torque and speed of a servo system. The faster the update rate of the closed loop current control is, the higher the bandwidth of the torque control. This will in turn affect system turn around time or cycle time of the machine. For example, a surface mount component insertion machine requires fast pick-and-place times to shorten the total cycle time to complete component assembly.

A digital servo drive, although very flexible, has not yet come close to analog servo drives with respect to high bandwidth performance, especially high bandwidth torque control. This has mainly been due to DSP and microcontroller throughput limits stemming from the sequential computation mechanism of executing large numbers of instructions one-by-one.

Figure 7:
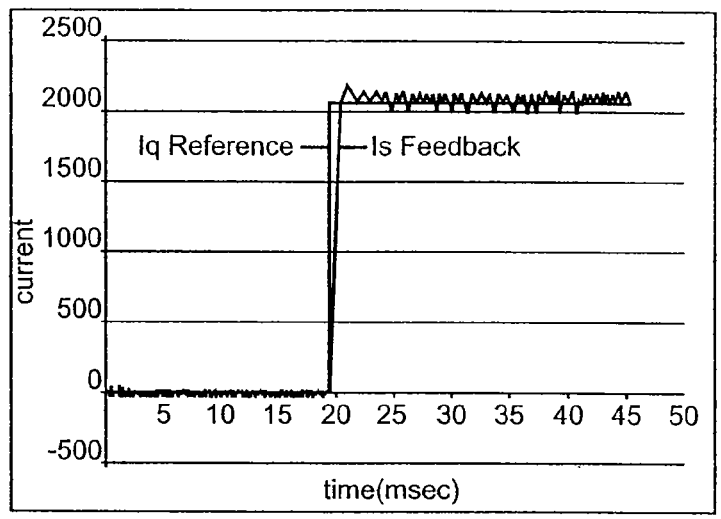
FIG. 7 shows a graph of the step response of the torque control loop of FIG. 6.

The integrated circuit of FIG. 6 equipped with the Motion Control Engine removes this barrier. The circuit can run at a 40 kHz PWM update rate or greater frequency update rate that is similar to an analog servo drive counterpart. FIG. 7 shows the step response to torque control loop. The two traces are torque current reference ("Iq reference") and torque current feedback ("Iq feedback"). The data was taken at a stalled rotor 40 kHz PWM frequency and 40 kHz current control loop update configuration. The reference amplitude is 50% of the rated motor current. As shown, it only takes approximately 350 microseconds for torque current to reach the reference.

The circuit of FIG. 6 reduces significantly the computation time of sensorless closed loop current control. This will benefit applications, which require sinusoidal sensorless control such as compressor motor drives of home air conditioner systems. A 32-bit high performance RISC microprocessor, for example, is used in the latest home-use air conditioning systems. With this microprocessor, computation power reaches 50 MIPS. However, it still takes sixty microseconds to execute the sensorless control algorithm. Since air conditioner applications require not only a single motor control by a sensorless algorithm but also additional sensorless motor control for the cooling fan and control for PFC (Power Factor Control) function, the total sum of computation time of the microprocessor still needs to be shortened to satisfy all these power hungry needs. Accordingly, memory usage is also increased since the instruction set is based on 32 bits. According to the application referenced, it requires 128 kB of instruction memory.

The circuit of FIG. 6 reduces computation time to 11 microseconds, instead of the 60 microseconds required by the prior art. This will create more time for faster update rates with higher PWM carrier frequencies. Ultra high speed applications using permanent magnet motors will benefit from the invention simply by adjusting the PWM carrier frequency to run at even 40 kHz or higher. High speed spindle and dental drill applications are examples of using such a high carrier frequency PWM with the circuit of FIG. 6.

Figure 8A:
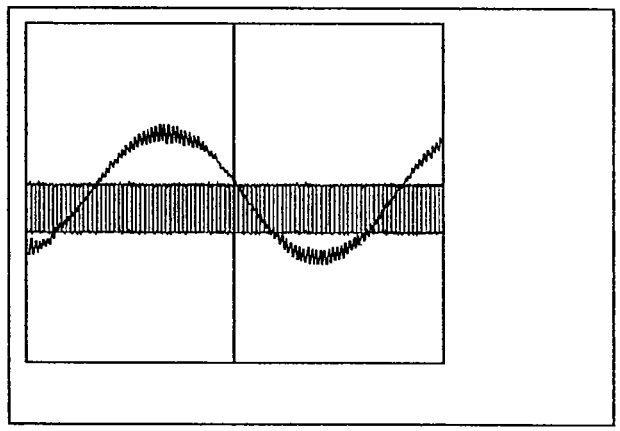
FIG. 8A shows typical 3 phase PWM waveforms and FIG. 8B shows similar waveforms of the circuit of the invention.
Figure 8B:
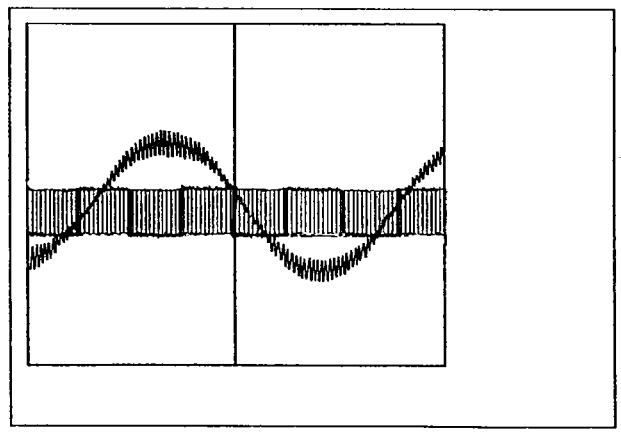

The circuit of FIG. 6 employs a low loss and low EMI Space Vector PWM method for switching output to the IGBT power devices. When compared to traditional 3-phase PWM, it reduces approximately 20% or more in power loss and EMI noise. A typical voltage switching waveform and motor current waveform are shown in FIG. 8A. FIG. 8A shows traditional 3-phase PWM. FIG. 8B shows the low loss low EMI PWM waveforms of the circuit of the invention.

A number of circuits are necessary to use the IC of FIG. 6 in a motor drive circuit. To take the process from prototyping to product release of the complete servo drive system, design of the power electronics circuit, analog signal conditioning circuit, switch mode power supply circuit, and sensor interface circuit are examples of circuit designs and essential elements of the complete servo amplifier system. In particular, the design of the power electronics circuit combined with thermal management require specific technical talent and experience and most frequently hinders users from completing hardware design.

Figure 9:
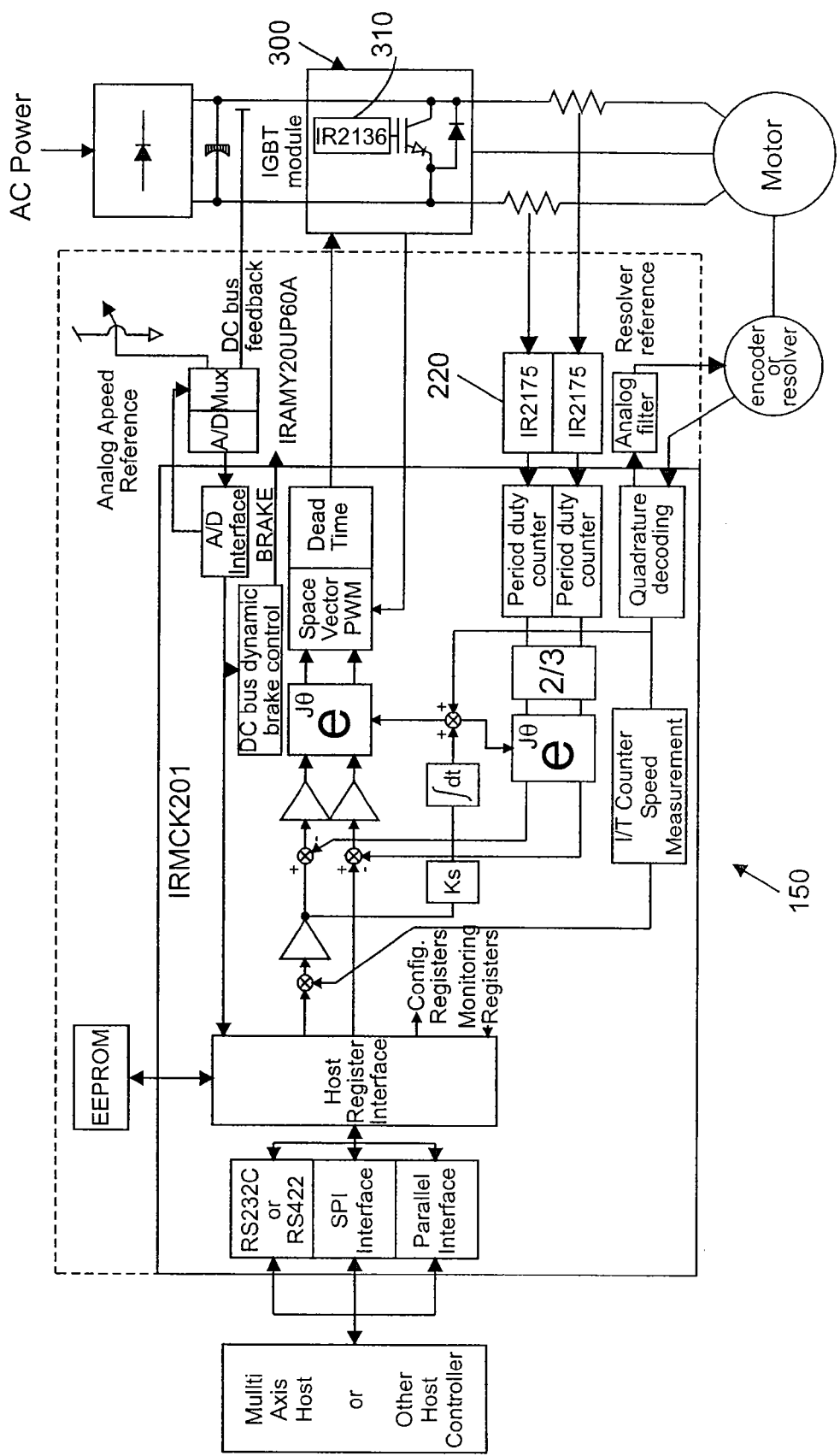
FIG. 9 shows a simplified version of the circuit of FIG. 6 controlling a motor.

In order to assist the user's design-in effort in a more comprehensive fashion, a design platform can be used as shown in FIG. 9. This design platform contains the necessary hardware including the heatsink and connectors. This hardware platform is very close to an actual product since its design incorporates many industry standards. For example, the PCB layout follows the UL508C, which/allows for the high voltage creepage distance requirement between high voltage potential traces. The user can immediately evaluate the system performance of the circuit without adding to or modifying the circuit. The design platform can be used with an IGBT intelligent module 300, for example, IRAMY20U60A or IRAMY16U60A, available from International Rectifier Corporation.

These modules 300, based on advanced IMS technology, integrate with the IR2136-3 phase high voltage gate drive IC 310 inside. Motor current sensing is implemented by the IR2175 monolithic high voltage IC 220. This IC is able to directly interface to MCE IC 150 and can be provided in a small SO-8 package to enable a very compact and simple motor current sensing function for sophisticated closed loop motor control application. 3-leg low side shunt resistor based current sensing can be used.

The motion control IC 150 combined with the intelligent IGBT 300 module and IR2175 current sensing IC 220 significantly simplify the user's power electronics design and reduce component count and board space.

The circuit 150 also preferably contains an overcurrent/short circuit protection circuit (not shown) to protect against any mode of overcurrent drive fault. A multiple output switched mode power supply and all necessary sensor interface circuits are also provided.

Figure 10:
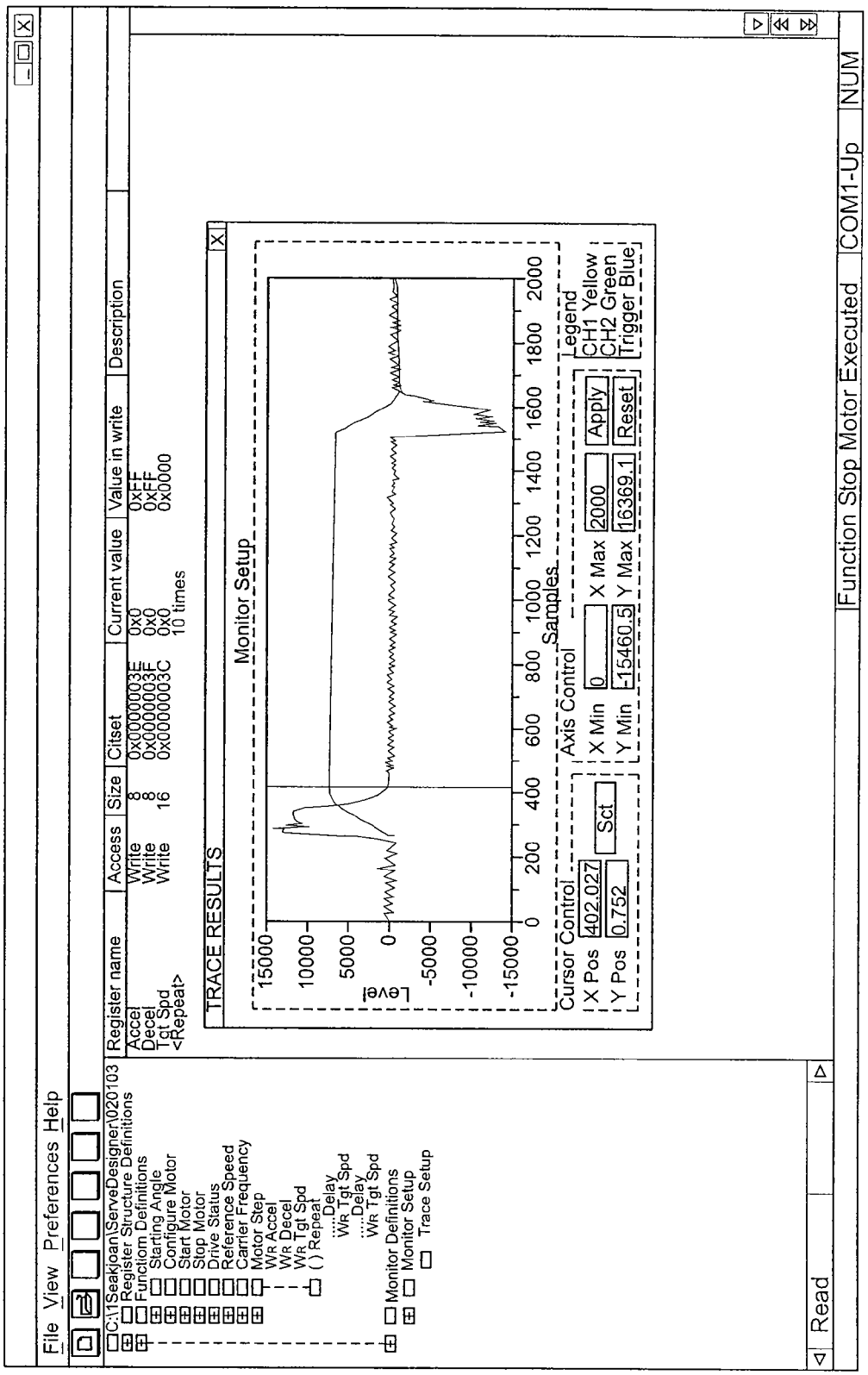
FIG. 10 shows a display from a PC design tool useful with the circuit of FIG. 9.

Although configuring the host registers is a simple process and does not require any programming or coding effort, it still requires writing specific values into each associated register. ServoDesigner™ is a window based PC tool that can be used to facilitate writing and reading the host registers without any other tools or preparation. FIG. 10 shows an example display of this tool. This tool can also be used to perform a user's factor parameter setting.

The tool is very flexible. The user can define which registers are to be accessed, change the register names, and customize reading and writing register groups into subgroups.

Defining and adding new functions enables powerful expansion and specific performance verification. For example, the user can create the sequence of moving motion consisting of a multiple start-and-stop speed profile with different acceleration/deceleration. This interactive motion profile generation provides a quick verification tool for the desired performance and simplifies and minimizes time for the application development process.

The ServoDesigner™ facilitates the diagnostic feature. Drive fault and status, indicating either the drive is running or at stop mode or faulted, is always displayed on the screen without any configuration effort.

Servo Designer™ also includes an interactive HELP menu and description of each host register to provide an effective configuration guiding tool for the user.

Configuring registers can be further simplified by using an Excel™ spreadsheet. ServoDesigner™ provides a supplemental Excel™ spreadsheet as a template for adapting and configuring a new motor. All the user has to do is to write the motor nameplate data such as motor current, speed, and encoder line count into the spreadsheet. Then this spreadsheet calculates and generates the values to be written to each specific host register. Then the user can "import" this spreadsheet data to ServoDesigner™ registers.

The tool contains EEPROM read/write unity so that the user can store tuned parameters and eliminate repetitive configurations.

Although the present invention has been described in relation to particular embodiments thereof, many other variations and modifications and other uses will become apparent to those skilled in the art. therefore, the present invention should be limited not by the specific disclosure herein, but only by the appended claims.

What is claimed is:

1. Apparatus for generating an algorithm for the motion control of an AC electric machine, the apparatus having a motion control engine comprising:
   a motion control sequencer;
   a motion control program memory;
   a further memory;
   a plurality of motion control hardware modules having hardwired functions, which functions are used for the motion control of an AC electric machine and wherein the hardware modules comprise inputs and outputs, which inputs and outputs are addressable by the motion control sequencer; and
   a plurality of motion peripheral hardware modules providing a peripheral interface and comprising inputs and outputs, which inputs and outputs are addressable by the motion control sequencer;
   a tool for producing at least one algorithm by selecting motion control and motion peripheral hardware modules and instructions for directing interconnection of the inputs and outputs of the selected motion control and motion peripheral hardware modules in a desired sequence of instructions; the at least one algorithm being stored in the motion control program memory;
   wherein the motion control sequencer executes the sequence of instructions of the at least one algorithm stored in the motion control program memory; and
   wherein the executed sequence instructs the motion control sequencer to move a data value from a location in the further memory to an input register for the module and when module execution is complete to move the data value from an output register for the module to a location in the further memory.

2. A motion control engine for controlling motion of an AC electric machine, the motion control engine comprising:
   a plurality of motion control modules, each capable of performing a hardwired function used for motion control of an AC electric machine;
   a plurality of peripheral interface modules for providing peripheral interface,
   each of the motion control and peripheral interface modules having one or more inputs and one or more outputs, which inputs and outputs are addressable by the motion control sequencer;
   a tool for producing at least one algorithm instruction set by selecting motion control and peripheral interface modules, connecting their inputs and outputs in a desired sequence, and specifying which inputs are to be supplied at runtime as operational parameters and which outputs are to be available externally for monitoring; and
   an MCE compiler for compiling the at least one algorithm instruction set into an MCE program.

3. The motion control engine of claim 2, further comprising first and second memory, wherein for each MCE program the MCE compiler further determines an appropriate layout of data usage in the second memory and encodes a detailed sequence of instructions for loading the inputs and routing the outputs of each motion control and peripheral interface module in the MCE program.

4. The motion control engine of claim 3, further comprising:
   a motion control sequencer for executing one or more MCE programs, each MCE program residing in a first memory and having instructions for managing data residing in the second memory, the MCE programs directing performance of one or more functions by the one or more of the motion control and peripheral interface modules having inputs and outputs connected in accordance with the MCE program instructions.

5. The motion control engine of claim 4, wherein the motion control sequencer controls the execution and I/O mapping of the motion control and peripheral interface modules.

6. The motion control engine of claim 5, wherein the MCE programs comprise a plurality of instructions to be interpreted by the MCE sequencer, the instructions being grouped into one or more categories selected from move instructions used to load the inputs and save the outputs, arithmetic instructions used to manipulate data in the process of mapping or connecting the inputs and outputs, and processor and program control instructions used to execute motion control and peripheral interface modules and to modify program flow.

7. The motion control engine of claim 6, wherein the move instructions perform movement a data value from an input location in the second memory to an input register of a motion control or peripheral interface module dedicated to that specific input, the input location in the second memory including a value selected from an operational parameter, a saved output from earlier executed motion control and peripheral interface module in the sequence, a saved output that is available to an external processor for monitoring.

8. The motion control engine of claim 7, wherein the motion control sequencer executes the motion control or peripheral interface module when all of its input registers of are loaded.

9. The motion control engine of claim 8, wherein the motion control sequencer is able to execute multiple motion control and peripheral interface modules simultaneously.

10. The motion control engine of claim 8, wherein the move instructions further perform movement a data value stored in an output register to an output location in the second memory, the output location in the second memory including a value selected from a temporary storage location to be used for input to a motion control or peripheral interface module to be executed and a location assigned to hold the output for monitoring.

11. The motion control engine of claim 2, wherein the tool further includes a display that enables a user to create the algorithm instruction set using graphical images of motion control and peripheral interface modules, wherein the user is enabled to select motion control and peripheral interface modules, connect the inputs and outputs in a desired sequence, and to specify which inputs are to be supplied at runtime as operational parameters and which outputs are to be made available for monitoring.

12. The motion control engine of claim 11, wherein the MCE compiler processes the algorithm instruction set to provide an optimal sequence of module execution.

* * * * *